US008682095B2

(12) United States Patent
Lee et al.

(10) Patent No.: US 8,682,095 B2
(45) Date of Patent: Mar. 25, 2014

(54) METHOD FOR RECOGNIZING MARKERS USING DYNAMIC THRESHOLD AND LEARNING SYSTEM BASED ON AUGMENTED REALITY USING MARKER RECOGNITION

(75) Inventors: Su Woong Lee, Daejeon (KR); Junsuk Lee, Daejeon (KR); Yong Hun Kim, Daejeon (KR); Seokjae Lee, Daejeon (KR); Sangwon Um, Daejeon (KR); Shihua Ming, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1301 days.

(21) Appl. No.: 12/496,275

(22) Filed: Jul. 1, 2009

(65) Prior Publication Data

US 2010/0111405 A1    May 6, 2010

(30) Foreign Application Priority Data

Nov. 4, 2008  (KR) .................. 10-2008-0108746

(51) Int. Cl.
*G06K 9/38* (2006.01)

(52) U.S. Cl.
USPC ........... 382/272; 382/171; 382/172; 382/224; 382/225; 382/270

(58) Field of Classification Search
USPC .................. 382/171–172, 224–225, 270, 272
See application file for complete search history.

(56) References Cited

U.S. PATENT DOCUMENTS

| 6,737,625 | B2 * | 5/2004 | Baharav et al. ............ 250/208.1 |
| 7,084,887 | B1 | 8/2006 | Sato et al. |
| 7,295,220 | B2 | 11/2007 | Zhou et al. |
| 7,333,656 | B2 * | 2/2008 | Takarada ....................... 382/169 |
| 7,343,278 | B2 | 3/2008 | Billinghurst et al. |
| 8,064,097 | B2 * | 11/2011 | Hachiro ........................ 358/1.6 |
| 2001/0002936 | A1 * | 6/2001 | Tsuji et al. .................... 382/170 |
| 2003/0118233 | A1 * | 6/2003 | Olsson ......................... 382/173 |
| 2003/0133612 | A1 * | 7/2003 | Fan .............................. 382/199 |
| 2003/0137593 | A1 * | 7/2003 | Watanabe et al. ............. 348/274 |
| 2007/0025614 | A1 * | 2/2007 | Qian ............................. 382/171 |
| 2007/0025625 | A1 * | 2/2007 | Burian et al. ................. 382/237 |
| 2007/0098234 | A1 * | 5/2007 | Fiala ............................ 382/120 |
| 2009/0168089 | A1 * | 7/2009 | Hachiro ....................... 358/1.13 |
| 2009/0185236 | A1 * | 7/2009 | Zeng ............................ 358/450 |
| 2011/0142335 | A1 * | 6/2011 | Ghanem et al. ............... 382/165 |
| 2011/0200250 | A1 * | 8/2011 | Oh et al. ....................... 382/164 |

FOREIGN PATENT DOCUMENTS

| EP | 0 899 690 A2 | 3/1999 |
| EP | 1 791 076 A2 | 5/2007 |
| JP | 7-296387 | 11/1995 |
| JP | 2004-139294 | 5/2004 |

(Continued)

*Primary Examiner* — Jayesh A Patel
(74) *Attorney, Agent, or Firm* — Staas & Halsey LLP

(57) ABSTRACT

A method for recognizing markers printed on a learning material, includes sampling an image of the learning material; grouping the sampled image of pixels into a first image group and a second image group based on a threshold; and calculating medians of the first image group and the second image group to update the threshold with a first average value of the calculated medians. Further, the method for recognizing markers printed on the learning material includes repeating the above until a difference between a previous threshold and an updated threshold is equal to or smaller than a reference value; binarizing an image captured by a camera based on the updated threshold; and detecting the markers based on the binary image.

6 Claims, 10 Drawing Sheets

(56) References Cited

FOREIGN PATENT DOCUMENTS

| JP | 2005-250950 | 9/2005 |
|----|-------------|--------|
| JP | 2008-242512 | 10/2008 |
| KR | 10-2006-0065159 | 6/2006 |
| KR | 10-0702534 | 3/2007 |
| KR | 10-2007-0050878 | 5/2007 |
| KR | 10-2007-0090730 | 9/2007 |
| KR | 10-0834905 | 5/2008 |

* cited by examiner

FIG.6A
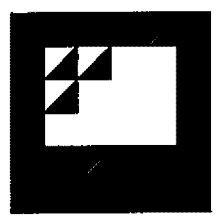 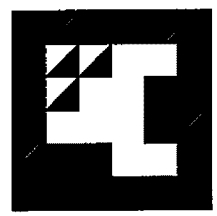
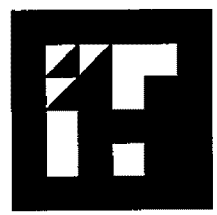 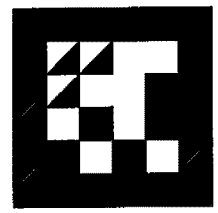
FIG.6B
 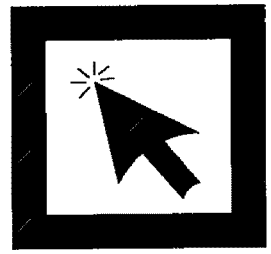
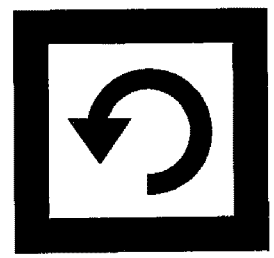 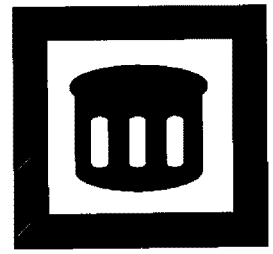

METHOD FOR RECOGNIZING MARKERS USING DYNAMIC THRESHOLD AND LEARNING SYSTEM BASED ON AUGMENTED REALITY USING MARKER RECOGNITION

CROSS-REFERENCE TO RELATED APPLICATIONS

The present invention claims priority of Korean Patent Application No. 10-2008-0108746, filed on Nov. 4, 2008, which is incorporated herein by reference.

FIELD OF THE INVENTION

The present invention relates to a method for recognizing markers using dynamic threshold and a learning system based on augmented reality using marker recognition.

BACKGROUND OF THE INVENTION

A marker recognition unit recognizes a marker printed on a plane or a cubic plane and acquires corresponding data of the marker. Such marker recognition unit has been applied to a learning system, called electronic learning (e-learning) or ubiquitous learning (u-learning), in combination with augmented reality technology.

The virtual reality is conceptually opposite to the augmented reality. The virtual reality is one of new paradigms of an information activity field. The virtual reality is designed to make a user indirectly experience situations that the user cannot experience in the real world due to spatial and physical restrictions through an interaction with a human sensory system in a virtual space built up by a computer. An ultimate goal of the virtual reality is to provide an environment that allows a user to communicate with a computer more realistically by improving the capability of communicating with a computer using various input/output devices. As the input/output devices for a user and a computer, a head-mounted display (HMD), a data glove, and a motion capture device have been used. The HMD transmits position data that changes according to the head movement of a user to a computer. The computer simulates an object to be shown to a user by calculating the size and depth of an object based on the received position data. The data glove senses positions and moving directions of hands of the user. When the user moves his hands in a three-dimensional space, the data glove transmits corresponding data to the computer in three-dimensional coordinates. The computer manipulates an object based on the received data.

The augmented reality is a term derived from a virtual environment and the virtual reality. The augmented reality denotes mixing a real-world image with a virtual image by inserting a computer graphic image in a real-world environment.

Real-world information may include unnecessary information or may not include sufficient information that a user needs. It is possible to simplify the unnecessary information or to make the unnecessary information not to be shown by using a computer-simulated virtual environment. In other words, an augmented reality system enables interaction with a user in real time by combining a real world with a virtual world.

Simple examples of the augmented reality appear in weather forecast and entertainment areas. When a weather forecast is presented on TV, viewers watch a weather map behind a weatherman change smoothly. What is actually happening, however, is that the weatherman is standing in front of a blue screen and a computer simulates virtual images in a virtual studio environment, which is the augmented reality. Further, the augmented reality may be applied to a medial area and help a doctor smoothly carry out an operation on a patient by acquiring three-dimensional data of the patient in real time through indirect tests, such as magnetic resonance images (MRI), computed Tomography Image (CTI), and ultrasonic images, rendering the acquired data in real time, and representing them overlapped with the patient. Also, the augmented reality may be applied to aviation and provide a pilot with much information needed for flight by displaying virtual image on a visor of the pilot's helmet or the windshield of the flight deck.

There is a conventional marker recognition system that recognizes a three-dimensional marker in a real image using a Descartes coordinate type three-dimensional marker. Further, there is another conventional technology for improving the performance of extracting a marker ID. In this conventional technology, a marker is divided into 36 regions. Then, 10-bits of the marker are used to identify a marker ID, and 26-bits of the marker are allocated as a cyclic redundancy check (CRC) code in order to improve the performance of extracting the marker ID.

There are several problems in realizing a ubiquitous learning system by combining the above-described conventional marker recognition technology with the augmented reality technology.

A marker recognition technology is required to be robust in various camera and illumination environments. Also, since learners tend to be uncomfortable with a marker printed on a learning material of a ubiquitous learning system, the size of the marker printed on the learning material is made as small as possible while increasing the recognition rate of the marker. Furthermore, as the number of pages of a book increases, the kinds of markers included in a book become diverse. Therefore, it is required to develop a pattern authoring and recognizing mechanism that can efficiently author and recognize the diverse kinds of markers.

SUMMARY OF THE INVENTION

In view of the above, the present invention provides a method for recognizing markers using dynamic threshold and a learning system based on augmented reality using marker recognition.

Further, the present invention provides a marker recognition apparatus and method applicable to various learning systems in combination with the augmented reality technology.

In accordance with a first aspect of the present invention, there is provided a method for recognizing markers printed on a learning material, including: sampling an image of the learning material; grouping the sampled image of pixels into a first image group and a second image group based on a threshold; calculating medians of the first image group and the second image group to update the threshold with a first average value of the calculated medians; repeating the above until a difference between a previous threshold and an updated threshold is equal to or smaller than a reference value; and binarizing an image captured by a camera based on the updated threshold; and detecting the markers based on the binary image.

In accordance with a second aspect of the present invention, there is provided a learning system based on augmented reality, including: a camera for capturing an image of a learning material having a plurality of markers printed on the learning material the learning material; an image processing unit for performing sampling on the image of the learning material; a marker recognition unit for recognizing markers from the binary image; an object augmentation unit for augmenting a virtual object formed of 3D contents based on the recognized markers; and a control unit for controlling the augmented reality image to display.

When a threshold is determined and a marker is recognized based on the threshold, it is possible to exactly recognize a marker despite an instant or gradual change in illumination of image. Also, although the threshold is determined dynamically, there is no drastic surge in the computation amount through proper sampling and dynamic change in sampling objects.

BRIEF DESCRIPTION OF THE DRAWINGS

The objects and features of the present invention will become apparent from the following description of an embodiment given in conjunction with the accompanying drawings, in which:

FIGS. 6A and 6B show examples of markers used in the embodiment of the present invention;

DETAILED DESCRIPTION OF THE EMBODIMENT

Hereinafter, exemplary embodiments of the present invention will be described in detail with reference to the accompanying drawings, which form a part hereof.

Figure 1:
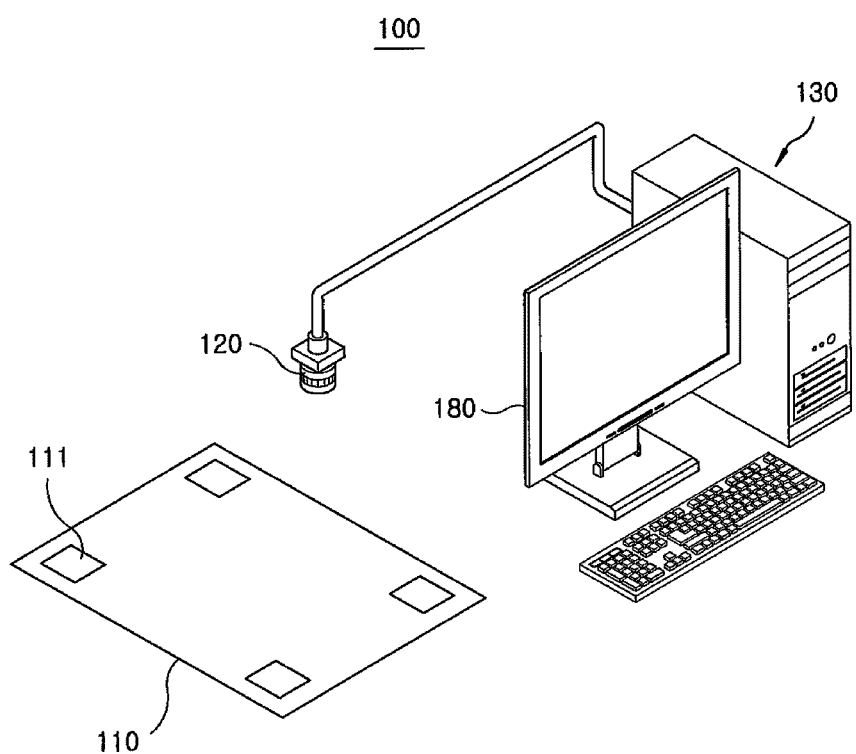
FIG. 1 illustrates an exemplary embodiment of a learning system in accordance with the present invention.
Figure 2:
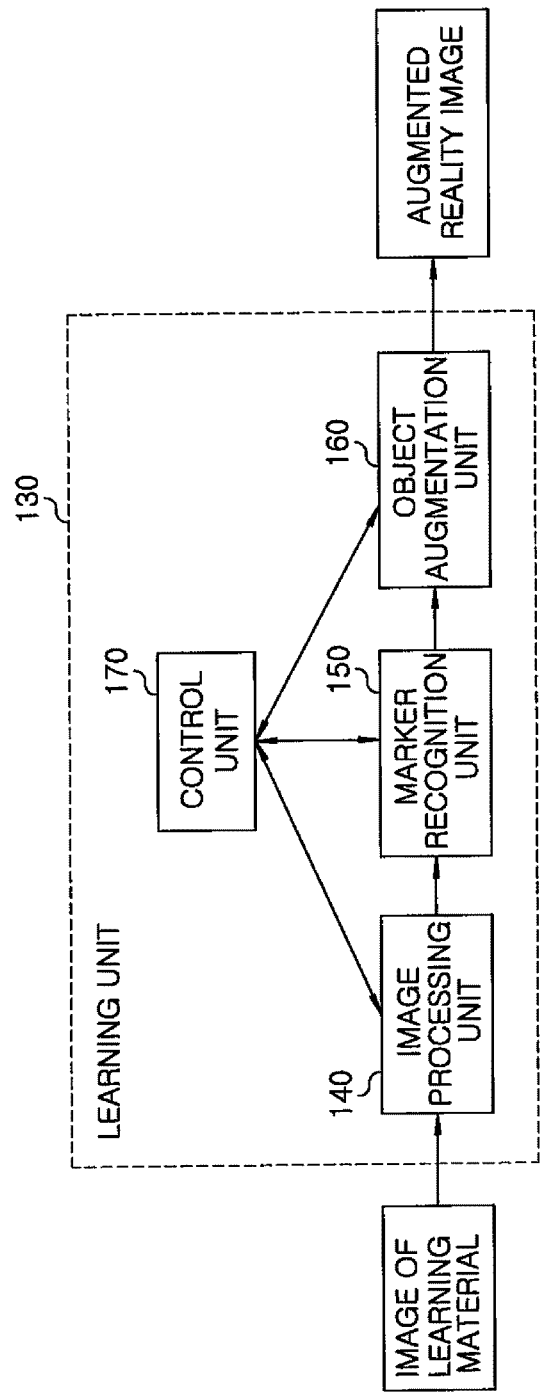
FIG. 2 illustrates a detailed block diagram of the learning unit shown in FIG. 1

FIG. 1 illustrates an exemplary embodiment of a learning system in accordance with the present invention. The learning system 100 shown in FIG. 1 includes a learning material 110 printed with markers 111, a camera 120 for capturing the learning material 110 with markers 111 printed thereon, a learning unit 130 for processing an image captured by the camera 120 to recognize the markers 111, and a display 180 for displaying an image of augmented reality using the recognized markers. The learning unit 130 and the camera 120 may be implemented with a general-purpose computer and a web camera, whereby the learning system may be realized in cost effective. The marker 111 may be printed on the learning material 110, may be printed on, e.g., one side of a cubic object, or may be attached to, e.g., a human body. In this embodiment, at least two kinds of markers are used. One is a code-type marker with certain encoded information, and the other is an icon marker having a predetermined shape. FIGS. 6A and 6B show examples of markers used in the embodiment of the present invention. FIG. 6A shows the code-type marker, whereas FIG. 6B shows the icon marker. FIG. 2 illustrates a detailed block diagram of a learning unit 130 shown in FIG. 1.

The learning unit 130 includes an image processing unit 140, a marker recognition unit 150, an object augmentation unit 160 and a control unit 170. The image processing unit 140 samples the image of the learning material 110 to produce first sampled images, and divides the first sampled images into a first image group and a second image group based on a predetermined threshold. In addition, the image processing unit 140 calculates medians of the first image group and the second image group, and updates the predetermined threshold to an average of the medians. The above operations performed by the image processing unit 140 are repeated until a difference between a previous threshold and an updated threshold is equal to or smaller than a reference value, thereby obtaining a binary image based on the updated threshold.

The marker recognition unit 150 recognizes markers having encoded information from the binary image. The object augmentation unit 160 augments a static or dynamic object formed of 3D contents based on the encoded information in the recognized markers 111. The control unit 170 controls the augmented object to display on the display 180.

If the markers 111 are printed on a cubic object, the learning unit 130 processes information of the printed markers 111.

Figure 3:
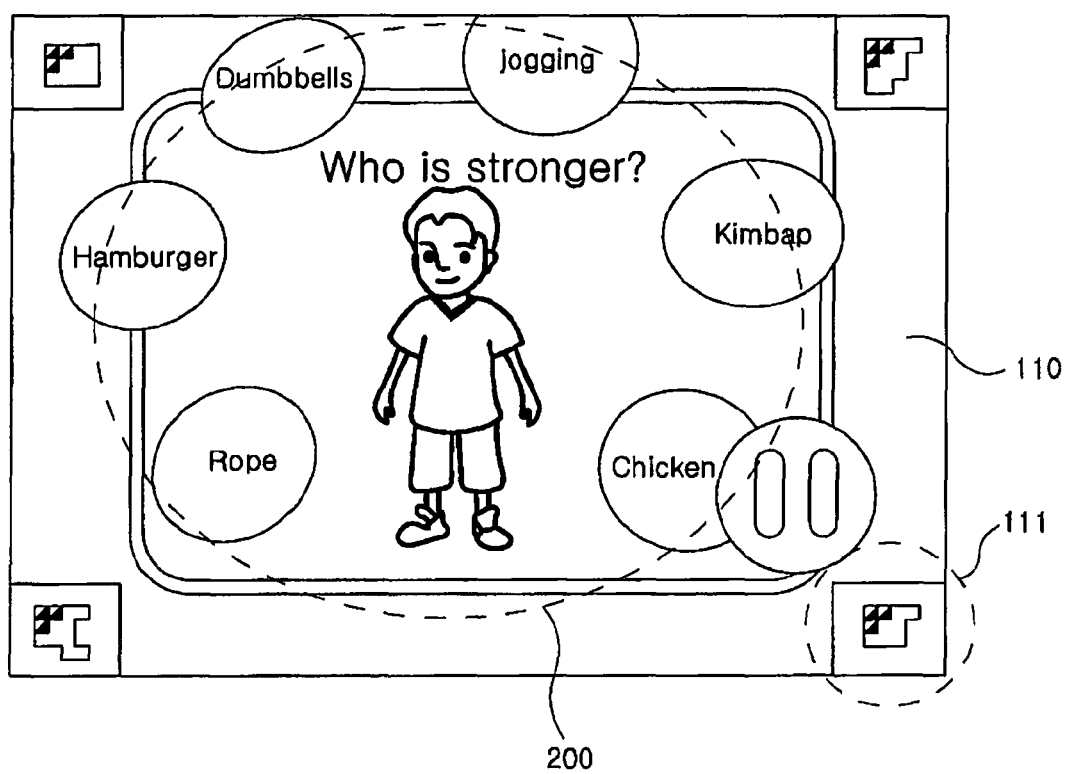
FIG. 3 shows an example of augmenting a three-dimensional (3D) contents produced by recognizing a marker and a hand of a user.

FIG. 3 shows an example of augmenting three-dimensional (3D) contents produced by recognizing a marker and a hand of a user. As illustrated, it is possible to augment the object 200 based on the encoded information of the markers 111. In addition, when the learner wears a marker in his finger, it is also possible to augment the object 200 based on the hand motion of the learner. To increase the recognition rate of the hand motion and precise recognition of the hand motion, the learner may wear a band-type marker in his finger.

Figure 4:
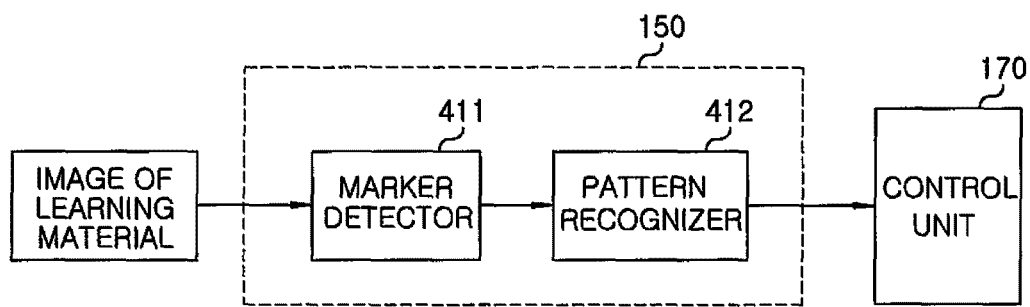
FIG. 4 is a diagram illustrating a marker recognition unit and a control unit in accordance with an embodiment of the present invention.

FIG. 4 is a block diagram illustrating the marker recognition unit 150 and the control unit 170 shown in FIG. 2. The marker recognition unit 150 receives the binary image of the learning material 110 from the image processing unit 140, detects markers from the binary image, and recognizes the markers by estimating a marker pattern ID. The marker recognition unit 150 includes a marker detector 411 and a pattern recognizer 412. The marker recognition unit 150 transmits information on the pattern ID of the markers to the control unit 170.

The marker detector 411 decides whether or not the outline of the markers is rectangular based on edge information of the image of the learning material 110. The pattern recognizer 412 recognizes the pattern of the detected markers based on the edge information and color information and detects a marker pattern ID of the recognized marker.

Figure 5:
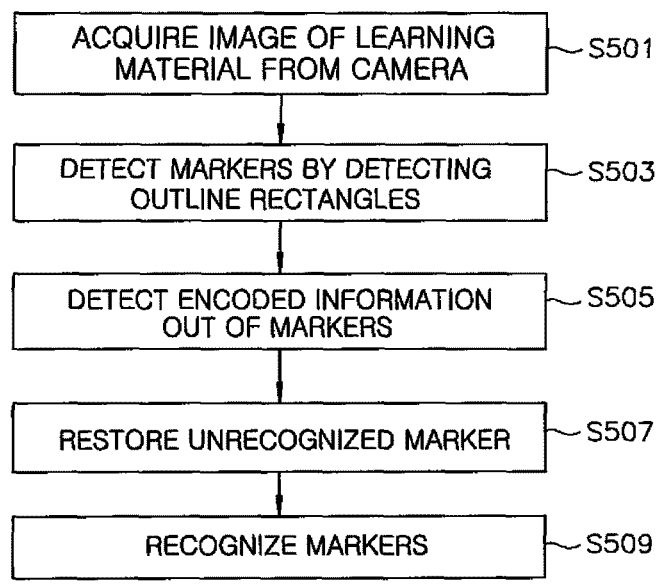
FIG. 5 is a flowchart describing a process of detecting a pattern identification (ID) of a marker in the marker recognition unit shown in FIG. 4.

FIG. 5 is a flowchart describing a process of detecting a marker pattern ID in the marker recognition unit 150 shown in FIG. 4.

At step S501, the marker recognition unit 150 acquires a binary image of the learning material 110 from camera 120. At step S503, the marker recognition unit 150 detects markers by detecting the outline of the markers based on edge information of the acquired image. At step S505, the marker recognition unit 150 identifies the type of the markers based on the marker type indication information of the detected markers, and detects encoded information out of the markers. Further, a type of the detected markers is distinguished through the use of marker type indication information. For example, the marker type indication information includes an internal characteristic line formed inside markers.

Hereafter, the encoded information in the markers and information that can be detected from the markers will be referred to as the marker pattern ID.

Also, when there is a change in the recognized markers or a marker is not recognized by being covered with an obstacle, the unrecognized marker is restored at step S507, and the recognition of the markers are completed at step 5509.

Figure 7:
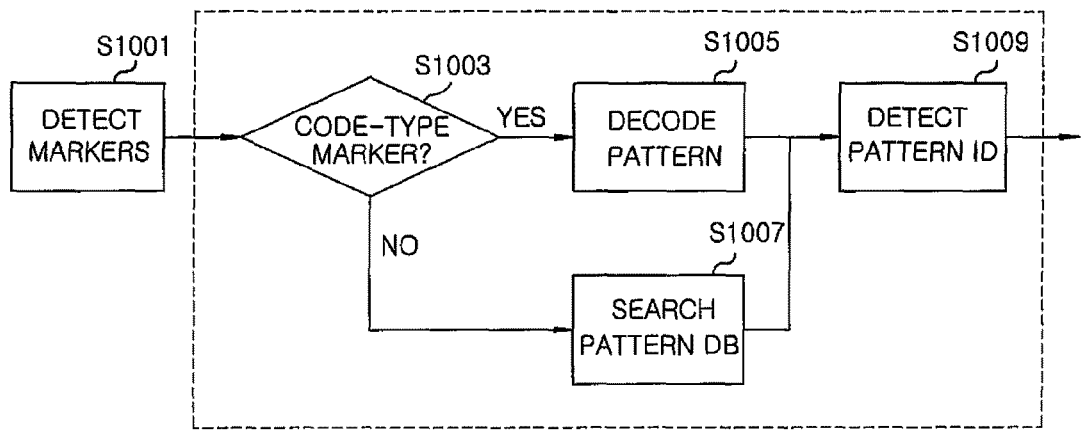
FIG. 7 is a flowchart describing a pattern recognition process of a pattern recognizer capable of recognizing a fixed pattern and an icon pattern in one framework from the marker rectangles detected in the marker detector.

FIG. 7 is a flowchart describing a pattern recognition process of the pattern recognizer 412 shown in FIG. 4.

At step S1001, markers are detected. At step S1003, the inside of the detected markers is searched for ID information for distinguishing whether the detected markers are code-type markers or icon markers, for example, an internal characteristic line formed inside markers according to a predetermined rule. When the markers are decided to be code-type markers according to whether or not there is ID information, at step S1005, encoded information in the code-type marker is decoded. In a case where the markers are icon markers, at step S1007, a pattern database (DB) is searched to find out which icons they are. At step S1009, information corresponding to the markers, which is the pattern ID, is acquired.

Accordingly, it is possible to reduce flicking phenomenon, which occurs as synthesized virtual contents disappear due to a change in illumination or because a marker printed on the learning material is covered with an obstacle, e.g., an icon pattern, and not recognized.

According to the embodiment of the present invention, the image photographed by a camera is binarized to recognize the markers. In this case, a method of deciding a threshold, which becomes a reference value for the binarization becomes a problem. As described above, the embodiment of the present invention may be applied to diverse general devices, such as personal computers and laptop computers, and there is no restriction in the kind of camera, either. However, the recognition rate of a marker may be different according to the characteristics of a camera. Also, the recognition rate of a marker may be different according to a change in external illumination environment where learning is carried out. The embodiment of the present invention suggests a method of dynamically determining a threshold, which distinguishes a dark part from a bright part in the photographed image during the marker recognition process, to have an excellent recognition rate in diverse camera and illumination environments.

Hereafter, the method of dynamically determining a threshold, which distinguishes a dark part from a bright part in the photographed image, will be described. According to the present invention, it is possible to dynamically decide the threshold ($T_i$), which distinguishes a dark part from a bright part in the photographed image, by using a sampled part among the pixels of the image acquired from a camera.

Figure 8:
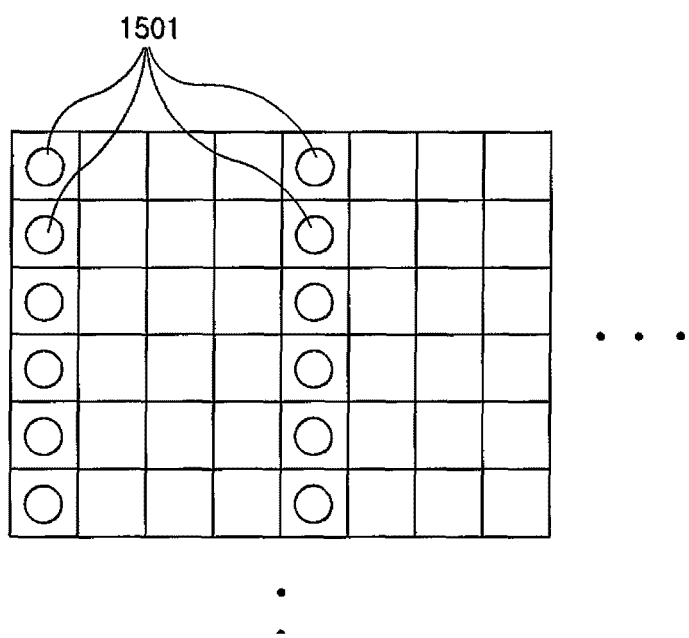
FIG. 8 exemplarily illustrates a sampled part in an image captured by a camera.

FIG. 8 exemplarily illustrates a sampled part of an image photographed by the camera 120. As shown, sampling is performed on a four-pixel basis and the sampled pixels 1501 may be positioned adjacent to each other. When the sampling rate is adjusted or the sampled pixels have different patterns, the amount of computation for the sampling and the accuracy of the sampling are changed as well. Therefore, it is desirable to decide the sampling rate and the sampling pattern properly.

Figure 9:
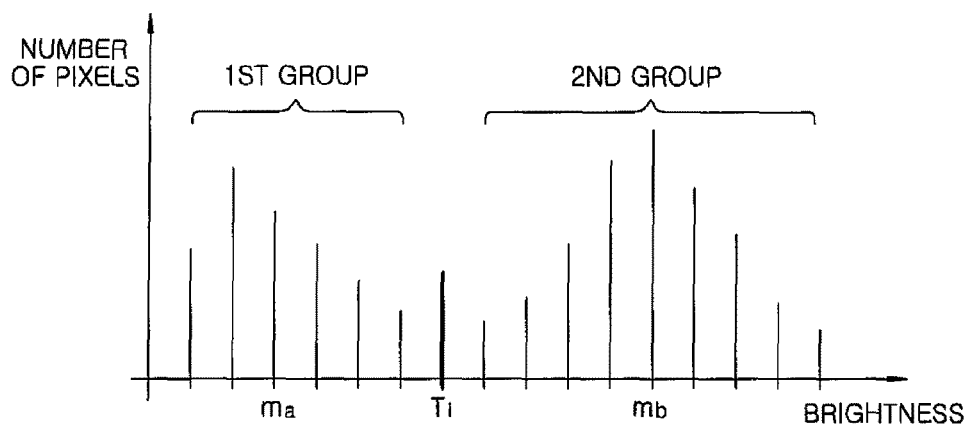
FIG. 9 exemplarily shows how image values of sampled pixels are grouped according to a threshold.

Image values of the sampled pixels are grouped according to a predetermined threshold into a first image group, which corresponds to black color, and a second image group, which corresponds to white color. FIG. 9 exemplarily shows how image values of sampled pixels are grouped. The horizontal axis of the graph shown in FIG. 9 shows brightness, and the vertical axis shows the number of pixels of a corresponding brightness level. Since the threshold ($T_i$) is set arbitrarily, it may be updated according to the first image group and the second image group. To be specific, a new threshold ($T_{i+1}$) may be calculated by obtaining an average between the median ($m_a$) of the first image group and the median ($m_b$) of the second image group.

Figure 10:
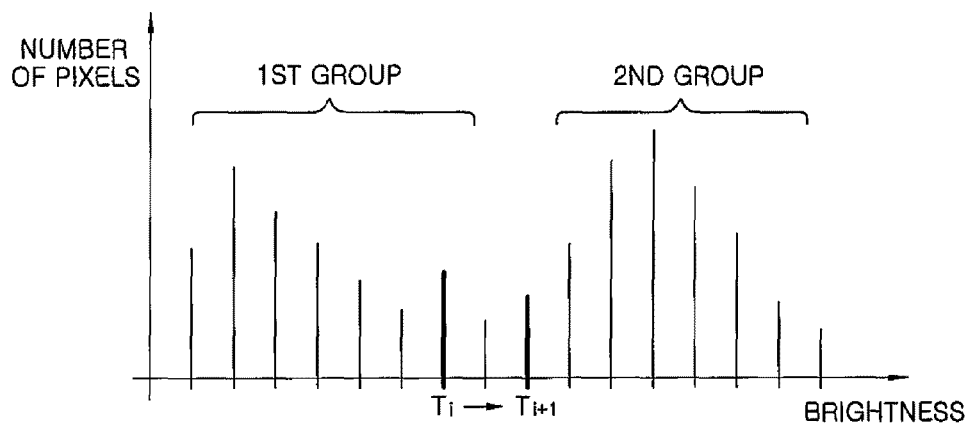
FIG. 10 exemplarily shows a first group and a second group acquired based on an updated threshold.

FIG. 10 exemplarily shows a first group and a second group acquired based on an updated threshold. Image values of sampled pixels are divided again into a first group and a second group according to the updated threshold ($T_{i+1}$), and another new threshold ($T_{i+2}$) may be calculated based on the median of the first group and the median of the second group.

In this way, the threshold is updated in the order of $T_i$, $T_{i+1}$, and $T_{i+2}$. If an updated threshold value converges into the previous threshold before update, further updating stops and it is desirable to distinguish a black part and a white part in the photographed image, that is, binarization, based on the new threshold. To be specific, when the updated threshold is the same as the previous threshold, or when the difference between the updated threshold and the previous threshold is equal to or smaller than a predetermined reference value, further updating stops and a black part and a white part of the photographed image is distinguished based on the new threshold.

When an image is binarized according to the above-described dynamic threshold determining method, it is possible to accurately distinguish black pixels and white pixels despite instant or gradual change in illumination. Thus, the marker recognition rate is increased.

The above-described method is advantageous in that it can improve the marker recognition rate. However, it may have a problem of an increased amount of computation taken to determine the medians. To solve this problem, an embodiment of the present invention suggests a method of applying the dynamic threshold determining method only to a region to which a marker belongs.

Figure 11:
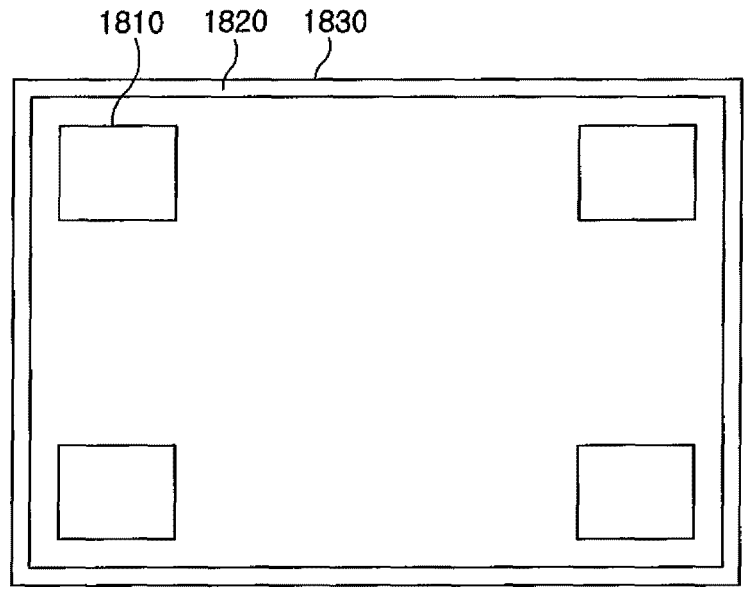
FIG. 11 illustrates a region to which a dynamic threshold determining method is applied.

FIG. 11 illustrates a region to which a dynamic threshold determining method is applied. As shown, when markers 1810 are printed on a learning material 1830, the threshold determining method of FIGS. 15 and 16 may be applied to a region 1820 that corresponds to the entire learning material 1830. Also, the method of FIGS. 15 and 16 may be applied only to the region of the markers 1810.

Figure 12:
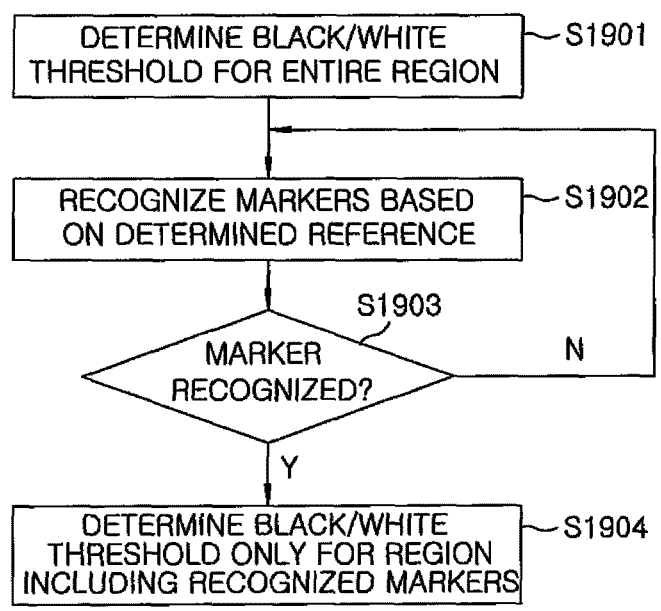
FIG. 12 is a flowchart describing a method of determining a threshold while decreasing a computation amount in accordance with the embodiment of the present invention.

FIG. 12 is a flowchart describing a method of determining the predetermined threshold used in the image processing unit 140 shown in FIG. 2.

At step S1901, a threshold is initially determined by performing sampling with respect to the entire image of the region 1820 and applying the method of FIGS. 15 and 16 with respect to the sampled images. When the threshold is determined, at step S1902, marker recognition is performed based on the threshold.

At step S1903, it is determined whether markers are normally recognized. If it is determined that at step s1903 that the markers are recognized normally, a control process goes to step S1904 where only the region that the markers belong is sampled and a threshold is dynamically determined repeatedly based on the sampling result. However, if not at step s1903, a control process returns step s1902 to repeatedly perform the marker recognition. According to the method of FIG. 12, it is possible to increase the marker recognition rate by precisely determining the threshold while minimizing an increase in the computation amount.

Figure 13:
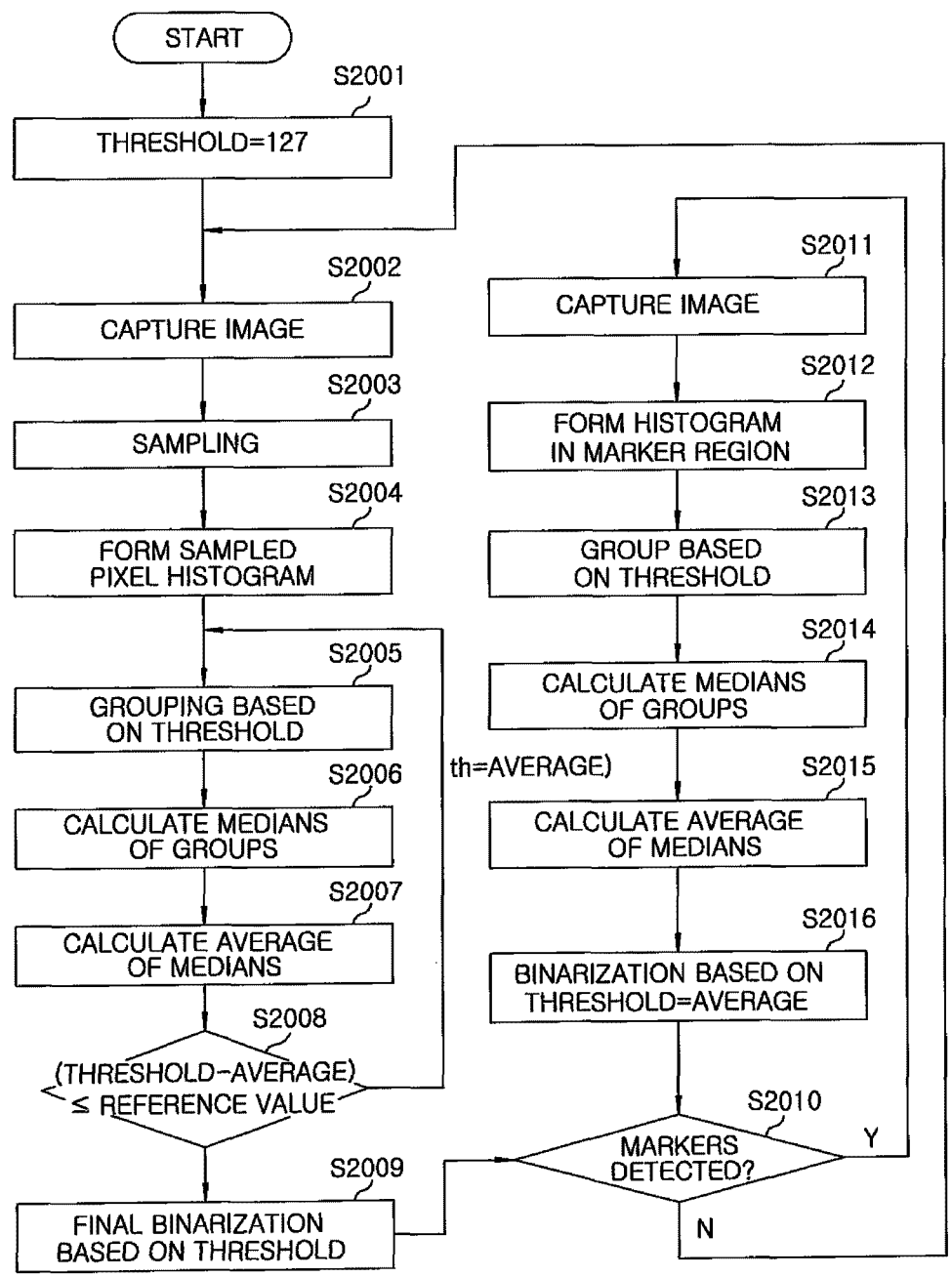
FIG. 13 is a flowchart describing a marker recognition method based on a dynamic threshold in accordance with an embodiment of the present invention.

FIG. 13 is a flowchart describing a marker recognition method based on a dynamic threshold in accordance with an embodiment of the present invention.

A dynamic threshold determination method includes determining a threshold with respect to sampled pixels for the entire region at steps S2001 to 2009, and performing sampling only for the region to which markers belong and determining a threshold based on the sampled result.

First, a threshold is determined with respect to the entire region as follows. At step S2003, sampling is performed onto an image photographed by a camera to thereby produce sampled pixels. At step S2004, histogram is formed based on the sampled pixels. At step S2005, the sampled pixels are divided into a first image group and a second image group based on an initially determined threshold. At step S2006, the median of each image group are acquired. At step S2007, an average between the two medians is acquired. At steps S2005 to 2008, the threshold is updated until the difference between the determined threshold and the average becomes equal to or smaller than a reference value. When the difference between the previous threshold and an updated threshold is equal to or smaller than the predetermined value, further updating stops and binarization of the photographed image is performed based on a new threshold at steps S2009.

When the markers are detected from the binary image based on a threshold with respect to the entire region, the computation amount may be reduced by repeating a process of sampling only the region that the markers belongs and updating the threshold at steps S2010 to S2016. In a case where the markers are not detected, the marker recognition rate can be increased by repeating the process of performing sampling with respect to the entire region and determining the threshold at the steps S2001 to 2009.

While the invention has been shown and described with respect to the embodiment, it will be understood by those skilled in the art that various changes and modifications may be made without departing from the scope of the invention as defined in the following claims.

What is claimed is:

1. A method for recognizing markers printed on a material, comprising:
    sampling an image of the material;
    grouping the sampled image of pixels into a first image group and a second image group based on a threshold;
    calculating medians of the first image group and the second image group to update the threshold with a first average value of the calculated medians;
    repeating the grouping and calculating until a difference between a previous threshold and an updated threshold is equal to or smaller than a reference value;
    binarizing the image captured by a camera based on the updated threshold;
    detecting the markers based on the binary image
    sampling a region including the detected markers to thereby produce a second sampled image of pixels, when the markers are detected based on the binary image; and
    grouping the second sampled image of pixels into groups based on the threshold to update the threshold with a second average value of medians of the groups.

2. The method of claim 1, wherein each of the markers is a code type marker with predetermined encoded information therein or an icon marker having a predetermined shape.

3. The method of claim 1, wherein the image of the material is an image of the entire material including the markers.

4. The method of claim 1, wherein image values of the pixels correspond to brightness of the pixels.

5. The method of claim 1, wherein the markers are detected by detecting rectangular outlines of the markers or by detecting internal feature points based on edge information.

6. The method of claim 1, wherein the markers are code type markers with predetermined encoded information therein or icon markers having a predetermined shape.

* * * * *